United States Patent
Sukhija et al.

(10) Patent No.: US 11,574,306 B2
(45) Date of Patent: Feb. 7, 2023

(54) DIRECTING A TRANSACTION FROM ONE CARD TO ANOTHER CARD BASED ON A CARDHOLDER PREFERENCE PROVIDED TO AN ISSUER

(71) Applicant: Visa International Service Association, San Francisco, CA (US)

(72) Inventors: Rohit Sukhija, Karnataka (IN); Ashutosh Singh, Karnataka (IN); Amit Kumar Mishra, Karnataka (IN)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/712,427

(22) Filed: Dec. 12, 2019

(65) Prior Publication Data

US 2021/0182852 A1 Jun. 17, 2021

(51) Int. Cl.
G06Q 20/40 (2012.01)
G06Q 20/34 (2012.01)

(52) U.S. Cl.
CPC ....... *G06Q 20/401* (2013.01); *G06Q 20/3572* (2013.01)

(58) Field of Classification Search
CPC .................. G06Q 20/401; G06Q 20/3572
USPC .......................................................... 705/44
See application file for complete search history.

(56) References Cited

U.S. PATENT DOCUMENTS

| | | | | |
|---|---|---|---|---|
| 7,970,705 | B2* | 6/2011 | Patterson | G06Q 20/227 705/40 |
| 10,402,829 | B1* | 9/2019 | Baar | G06Q 20/227 |
| 2013/0085807 | A1* | 4/2013 | Cincotta | G06Q 30/0203 705/7.32 |

FOREIGN PATENT DOCUMENTS

WO WO-2015161235 A1 * 10/2015 ............. G06Q 20/24

OTHER PUBLICATIONS

Nassar et al., "Method for secure credit card transaction," 2013 International Conference on Collaboration Technologies and Systems (CTS), pp. 180-184. (Year: 2013).*

* cited by examiner

*Primary Examiner* — Hani M Kazimi
*Assistant Examiner* — Alison L. Lamb
(74) *Attorney, Agent, or Firm* — Schwabe, Williamson & Wyatt, PC

(57) ABSTRACT

A computer-implemented method performed by an issuer computer comprises receiving an authorization request for a transaction between a cardholder and a merchant using a first account identifier. A repository is searched for a preference set with the issuer by a cardholder to use a second account identifier when at least one transaction is received for the first account identifier. The transaction is authorized using the second account identifier in place of the first account identifier without knowledge by the merchant that the second account identifier was used. An authorization response is then returned to the merchant.

7 Claims, 5 Drawing Sheets

DIRECTING A TRANSACTION FROM ONE CARD TO ANOTHER CARD BASED ON A CARDHOLDER PREFERENCE PROVIDED TO AN ISSUER

BACKGROUND

Millions of transactions occur daily through the use of payment cards, such as credit cards, debit cards, prepaid cards, etc. Corresponding records of the transactions are recorded in databases for settlement and financial record keeping (e.g., to meet the requirements of government regulations). Payment accounts and associated payment cards are typically issued to people (referred to a cardholders) to conduct transactions by a business entity called an issuer, typically, a financial institution. The cardholders may then use their payment cards to pay for goods and services from a variety of different merchants. Upon first use of the card at a particular merchant, the cardholder is presented with a choice of having the merchant save the payment account information so the cardholder does not have to reenter the account information for subsequent transactions. Having merchants save payment account information as a "card on file" is a popular choice for cardholders, particularly for use with recurring payments.

Today, however, when a cardholder has chosen to save the same card on file across multiple merchants, there is no easy way for the cardholder to direct payment for recurring or cardholder initiated transactions from the card on file to another card without going through a tedious process with each merchant. This is usually desired by consumers when they want to use a new card that they have acquired for recurring or new transactions.

Accordingly, it be desirable to provide an improved method and system for directing a transaction from one card to another card.

BRIEF SUMMARY

The exemplary embodiment provides methods and systems for directing a transaction from one card to another card based on a cardholder preference provided to the issuer. Aspects of exemplary embodiment include receiving an authorization request by an issuer computer for a transaction between a cardholder and a merchant using a first account identifier. The issuer computer searches a repository for a preference set by a cardholder to use a second account identifier when at least one transaction is received for the first account identifier. The issuer computer authorizes the transaction using the second account identifier in place of the first account identifier without knowledge by the merchant that the second account identifier was used. The issuer computer then returns an authorization response to the merchant.

According to the method and system disclosed herein, the disclosed embodiments enable a cardholder to set preferences with an issuer (instead of the merchant) indicating that for the transactions received by the issuer for a current card on file, the issuer should process the transactions using the new card. By setting preferences once with the card issuer, the cardholder no longer has to register the new card multiple times with different merchants in order to direct future transactions, such as recurring payments, to the new card. In addition, the method and system leverages existing transaction infrastructure so that minimal changes are necessary to implement the disclosed process.

DETAILED DESCRIPTION

The exemplary embodiment relates to methods and systems for directing a payment from one card to another card. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Figure 1:
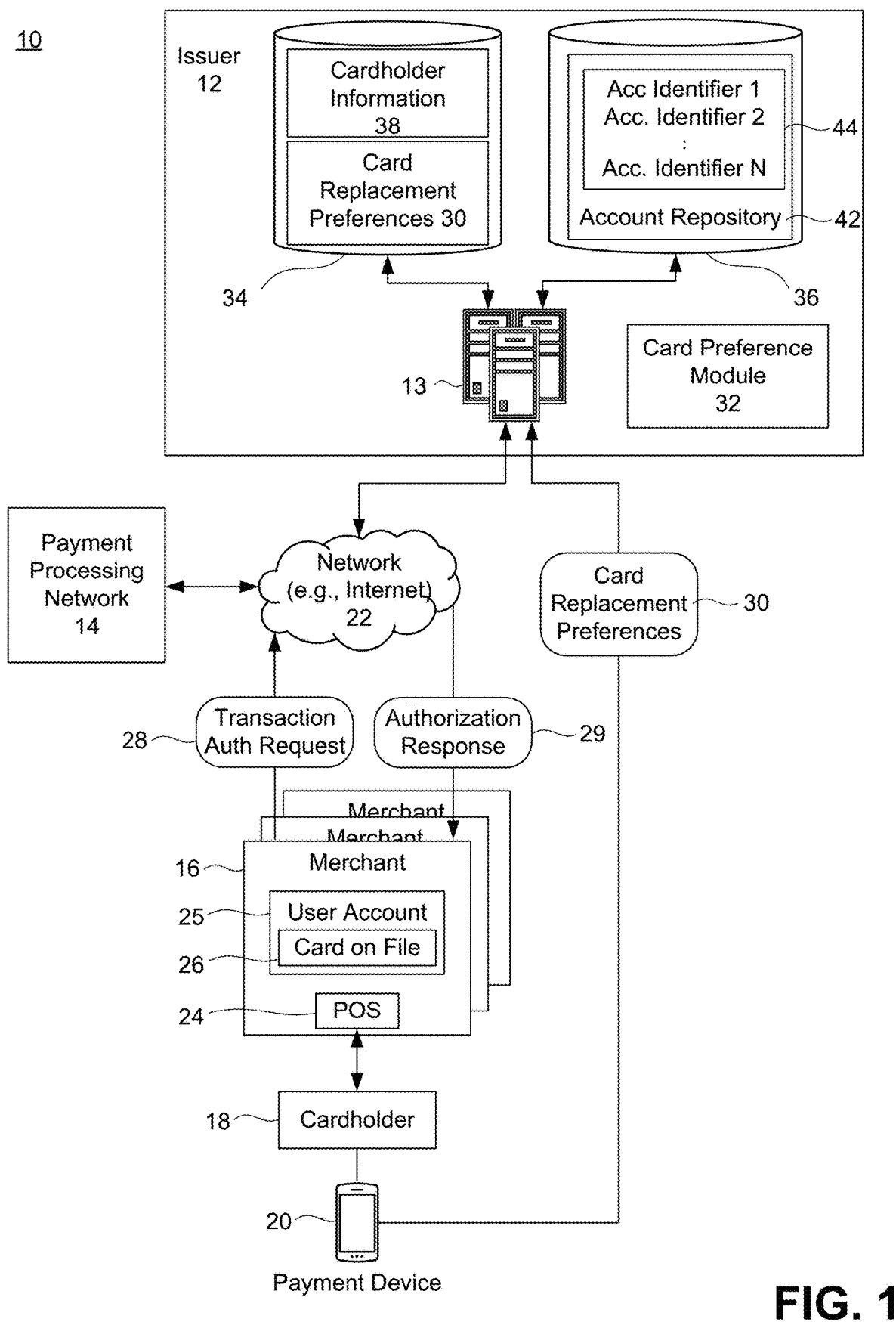
FIG. 1 is a block diagram illustrating a system for directing a transaction from one card to another card based on a cardholder preference provided to the issuer.

FIG. 1 is a block diagram illustrating a payment system for directing a transaction from one card to another card based on a cardholder preference provided to the issuer. The payment system 10 includes an issuer 12, a payment processing network 14, a merchant 16, a cardholder 18, and a payment device 20.

As used herein, the issuer 12 or card issuer, may refer to one or more entities that provide accounts to individuals (e.g., users, customers, and/or the like) for conducting transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein issuer may also include reference to an "issuer system" comprising one or more computer systems operated by or on behalf of an issuer, such as server 13, executing one or more software applications. For example, an issuer system may include one or more authorization servers for authorizing a transaction.

The term "server" may refer to one or more computing devices, such as processors, storage devices, and/or similar computer components, that communicate with client devices and/or other computing devices over a network, such as the Internet or private networks and, in some examples, facilitate communication among other servers and/or client devices. For example, the server computer can be a large mainframe, a minicomputer cluster, or a group of servers functioning as a unit. In one example, the server computer may be a database server coupled to a Web server, and may include or be coupled to a database.

The issuer 12 is in communication with the payment processing network 14 and the merchant 16 via a network 22, which may comprise a private network or a public network, such as the Internet. As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments, a request or message may refer to a network packet (e.g., a data packet and/or the like) that includes data.

The merchant 16 may refer to one or more entities (e.g., operators of retail businesses) that provide goods and/or services, and/or access to goods and/or services, to a user, based on a transaction, such as a payment transaction. As used herein "merchant system" may refer to one or more computer systems operated by or on behalf of a merchant, such as a server executing one or more software applications.

The merchant 16 may include a point-of-sale (POS) device 24 that may be used by the merchant 16 to conduct and/or process transactions. The POS device 24 may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like, used by the merchant 16 to conduct a transaction. In some embodiments, a POS system (e.g., a merchant POS system) may include one or more server computers programmed or configured to process online payment transactions through webpages, mobile applications, and/or the like.

The cardholder 18 is a user who is authorized to conduct transactions with the payment account provided by the issuer 12. The cardholder 18 can be, for example, the account owner of the account associated with a payment device, or an individual who is authorized to use the account on behalf of the account owner. The terms "cardholder" and "user" may be used interchangeably in the following description.

The cardholder 18 initiates a transaction for goods/services of the merchant 16 by presenting the payment device 20 to the POS device 24. The payment device 20 may a physical instrument containing an account identifier associated with an account used for conducting transactions. Examples of a payment device include a credit card, debit card, charge card, gift card, loyalty card, smartcard, payroll card, healthcare card or any combination thereof. As another example, the payment device 20 may be an electronic device that is used to conduct transactions, such as a mobile phone, smart media, a wristband, a machine-readable medium containing account information, a keychain device or fob, or an RFID transponder. The payment device 20 may include a volatile or a non-volatile memory to store information (e.g., an account identifier, a name of the account holder, and/or the like). In another embodiment, the payment device 20 may include the computer the cardholder 18 uses to enter account information into to make an online purchase from a website of the merchant 16.

As used herein, the term "account identifier" may refer to one or more types of identifiers associated with an account (e.g., a PAN associated with an account, a card number associated with an account, a payment card number associated with an account, a token associated with an account, and/or the like). In some non-limiting embodiments, the issuer 12 may provide an account identifier (e.g., a PAN, a token, and/or the like) to the cardholder 18 that uniquely identifies one or more accounts associated with that user. The account identifier may be embodied on the payment device 20 (e.g., a payment card, a credit card, a debit card, a gift card, and/or the like) and/or may be electronic information communicated to the user for use during electronic transactions. Account identifiers may be alphanumeric, any combination of characters and/or symbols, and/or the like.

Once the cardholder 18 presents the account identifier to the POS device 24 for a transaction, the POS device or other computer forwards the account identifier along with other transactional details, such as the payment amount, to the payment processing network 14 as a transaction authorization request 28.

The transaction authorization request 28 is an electronic message that is sent to request authorization for a transaction. The transaction authorization request 28 can be sent, for example, to the payment processing network 14 and/or the issuer 12 of the payment device 20. The transaction authorization request 28 may comply with (International Organization of Standardization) ISO 8583, which is a standard for systems that exchange electronic transaction information associated with a payment made by a consumer using a payment device or payment account. The transaction authorization request 28 may include an issuer account identifier that may be associated with the payment device 20 or payment account. The transaction authorization request 28 may also comprise additional data elements corresponding to "identification information" including, by way of example only: a service code, a CVV (card verification value), a dCVV (dynamic card verification value), an expiration date, etc. The transaction authorization request 28 may also comprise "transaction information," including any information associated with a current transaction, such as the transaction amount, merchant identifier, merchant location, etc., as well as any other information that may be utilized in determining whether to identify and/or authorize a transaction.

The payment processing network 14 may refer to an entity that receives the transaction authorization request 28 from the merchant 16 and other entities and provides guarantees of payment, in some cases through an agreement between the transaction service provider and the issuer 12. The payment processing network 14 may include one or more computer systems, processors or servers executing one or more software applications. The processors may be organized into data processing subsystems, networks, and operations used to support and deliver payment related services (e.g., authentication services, authorization services, exception file services, and clearing and settlement services, etc.). Examples of a payment processing network may include a payment network such as Visa®, MasterCard®, American Express®, or any other entity that processes credit card transactions, debit card transactions, and other types of commercial transactions.

The payment processing network 14 is configured to send or receive authorization data to the issuer 12. The issuer 12 is configured to receive authorization data from the payment processing network 14 (e.g., from an authorization server). Once the authorization data is received, the issuer 12 determines if the cardholder 18 is authorized to perform the given transaction (e.g., payment, cash deposit/withdrawal, money transfer, balance inquiries), and returns an authorization response message 29.

The authorization response message 29 may be an electronic message reply to the transaction authorization request 28. The authorization response message 29 may include, by way of example only, one or more of the following status indicators: Approval—transaction was approved; Decline—transaction was not approved; or Call Center—response pending more information, merchant must call the toll-free authorization phone number. The authorization response message 29 may also include an authorization code, which may be a code that the issuer 12 returns in response to transaction authorization request 28 in an electronic message (either directly or through the payment processing network) to the merchant's POS device 24 indicating approval of the transaction. The code may serve as proof of authorization.

Once the cardholder 18 presents the account identifier to the merchant 16 during the transaction, the merchant 16 may store the account identifier under a merchant record of the cardholder. An example of a merchant record may include a user account 25 that optionally stores a card on file 26, typically after the cardholder has given permission to do so. The card on file 26 may then be used by the merchant 16 as a default payment device, particularly for recurring (e.g., monthly) payments of the cardholder 18.

In conventional payment systems, if a cardholder has chosen to save the same card on file across multiple merchants 16, there is no easy way for the cardholder to direct payment for recurring or cardholder initiated transactions from the card on file 26 to another card/account without going through a tedious process to register a different card/account with each merchant.

In contrast to conventional payment systems, the payment system 10 of the disclosed embodiments enables cardholders 18 to direct a payment from one card to another card without having to notify each merchant 16 that has stored the card. In the payment system 10, the issuer 12 utilizes a card preference module 32 that accesses a cardholder information and preference repository 34 and an account repository 36 to enable the cardholder 18 to provide card replacement preferences 30 to the issuer 12, instead of the merchant 16. The card preference module 32 may comprise one or more software modules executing on an issuer computer, such as server 13, which may receive the card replacement preferences 30 submitted by the cardholder 18. The cardholder information and preference repository 34 stores cardholder information 38 as well as the card replacement preferences 30. The account repository 36 stores for each cardholder 18 a user account record 44 listing the account identifiers issued to that cardholder 18 by the issuer 12. In embodiments, the cardholder information and preference repository 34 and the account repository 36 may be implemented as a database or table, for example.

According to the disclosed embodiments, the card preference module 32 is notified which card/account the cardholder 18 would like to use for one or more transactions by receiving the card replacement preferences 30 from the cardholder. In embodiments, the replacement preferences 30 indicate that should the issuer 12 receive a transaction authorization request 28 for one card, the issuer 12 should direct payment from that card to a different card identified in the card replacement preferences 30.

In one embodiment, the card preference module 32 may be hosted on the server 13, but the card preference module 32 may be run on any type of one more computers that have memory and processor. Although the server 13 is shown as a single computer, it should be understood that the functions of server 13 may be distributed over more than one server, and the functionality of the card preference module 32 may be implemented using more than one software component.

Figure 2:
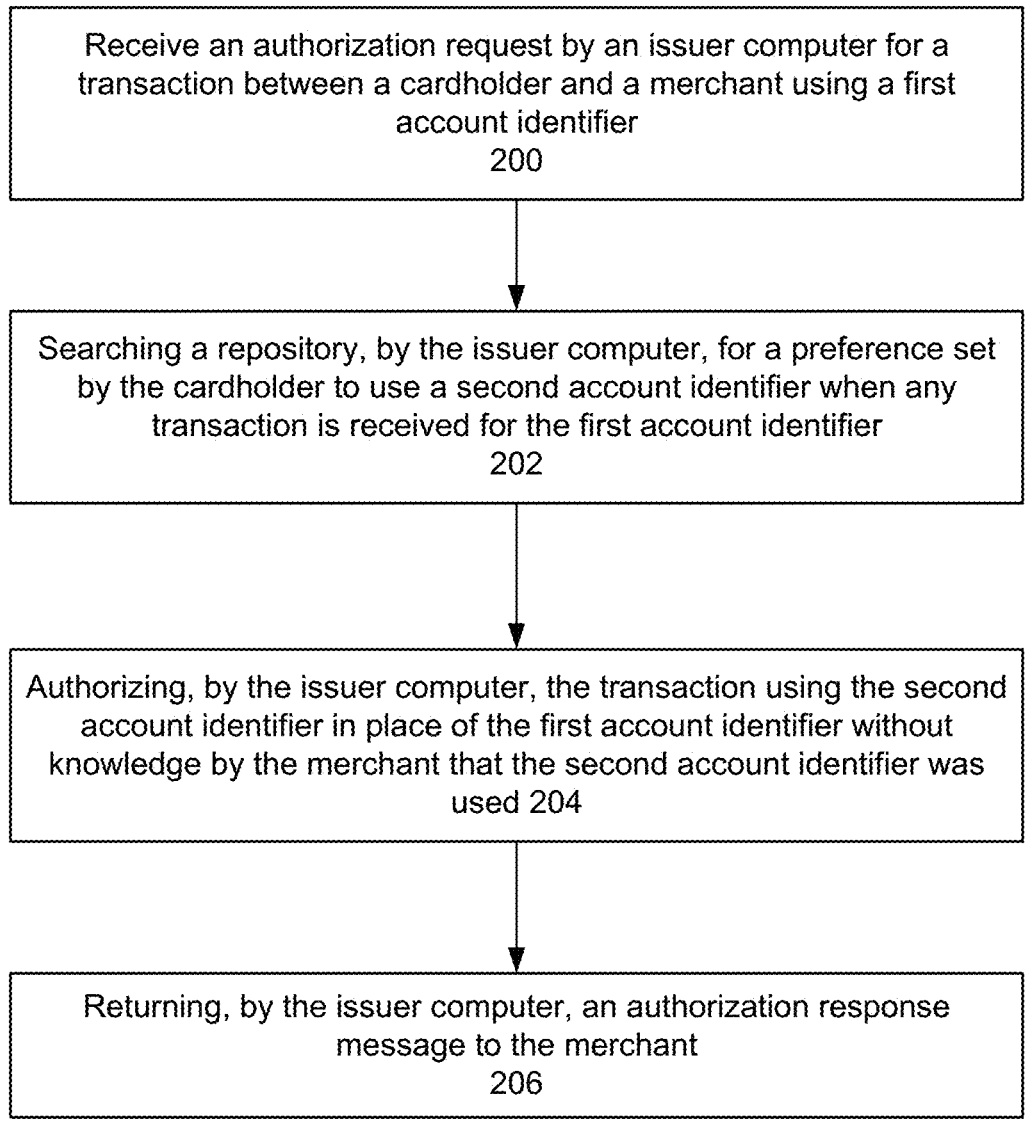
FIG. 2 is a flow diagram illustrating a process for directing a transaction from one card to another card based on a cardholder preference provided to the issuer.

FIG. 2 is a flow diagram illustrating a process for directing a transaction from one card to another card based on a cardholder preference provided to the issuer. The process may be implemented by the card preference module 32 executing on an issuer computer, such as server 13. The process may begin by the issuer computer receiving an authorization request for a transaction between a cardholder and a merchant using a first account identifier (block 200). An example of the authorization request is transaction authorization request 28. In response, the issuer computer searches a repository for a preference set with the issuer by a cardholder to use a second account identifier when at least one transaction is received for the first account identifier (block 202). For example, the card preference module 32 may search the card replacement preferences 30 in the cardholder information and preference repository 34. The issuer computer authorizes the transaction using the second account identifier in place of the first account identifier without knowledge by the merchant that the second account identifier was used (block 204). The issuer computer then returns the authorization response message 29 to the merchant (block 206).

In a further embodiment, the authorization response message 29 the issuer 12 returns to the merchant 16, or a separate communication, may notify the merchant 16 that the first account identifier of the cardholder was replaced by the second account identifier of the cardholder for the transaction.

In one embodiment, the notification may also include data instructing the merchant 16 to take an action on the replacement activity. An example could be an instruction to the merchant 16 to update the merchant record of the cardholder, such as the user account 25, by replacing the first account identifier, i.e., the card on file 26, with the second account identifier.

Figure 3A:
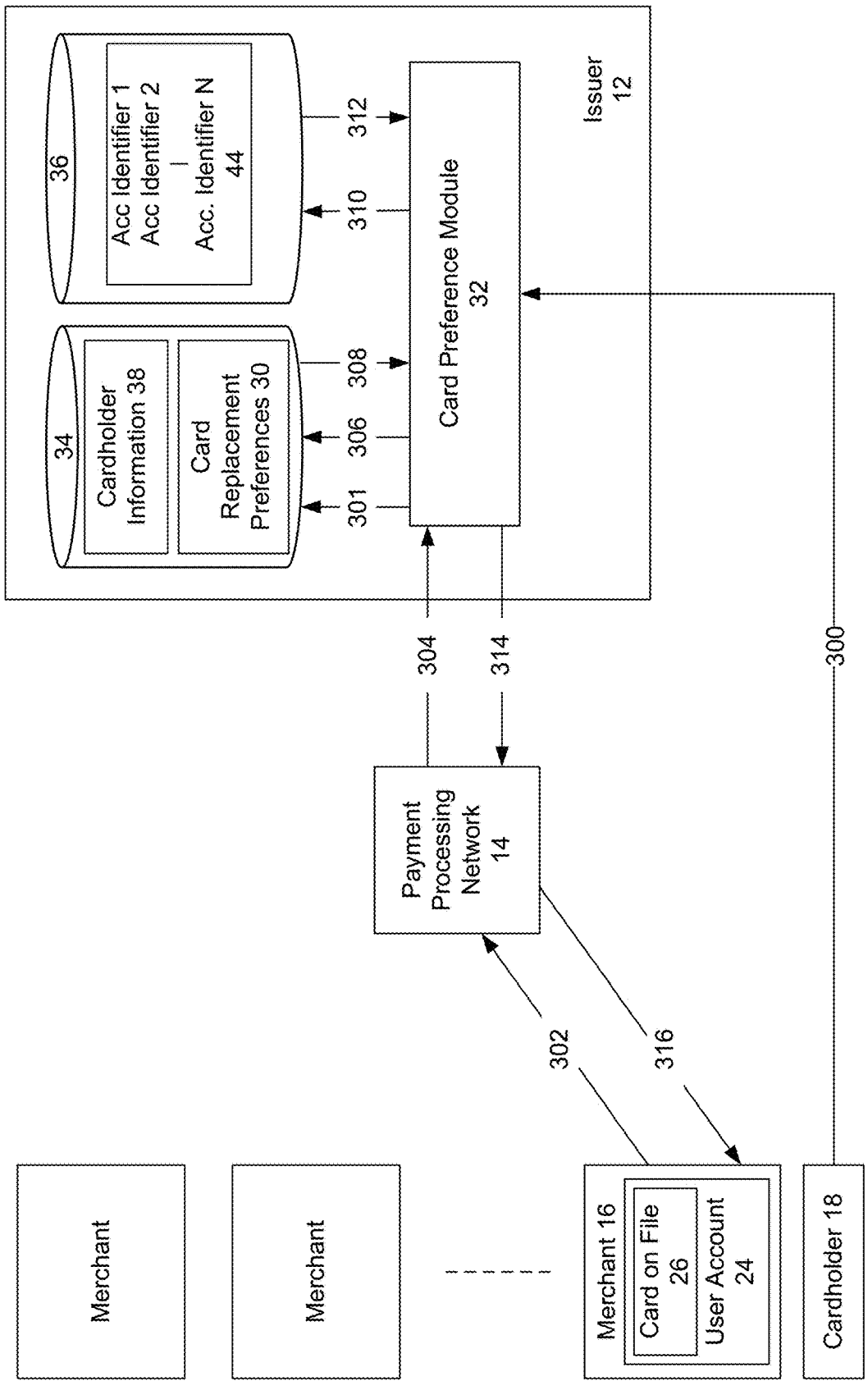
FIG. 3A is a block diagram illustrating the system and process for directing a payment from one card to another card in further detail.

FIG. 3A is a block diagram illustrating the system and process for directing a payment from one card to another card in further detail. Referring to FIGS. 1 and 3A, the process may begin at operation 300 by the card preference module 32 receiving the card replacement preferences 30 from the cardholder 18 indicating that a selected card/account identifier of the cardholder 18 should be used to process at least the current transaction and/or one or more future transactions. The card preference module 32 responds by storing the card replacement preference in the cardholder information and preference repository 34 at operation 301.

Figure 3B:
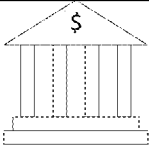
FIG. 3B is a diagram illustrating an example cardholder preference screen presented to the cardholder to set card preferences with the issuer.

FIG. 3B is a diagram illustrating an example of a card replacement preference screen 350 displayed on an electronic device to the cardholder to enter the card replacement preferences. In embodiments, the card replacement preference screen 350 may be displayed on a computer or mobile device of the cardholder 18. For example, the card replacement preference screen 350 may be displayed as part of a website of the issuer 12 on a computer or as part of a digital wallet running on the payment device 20, such as a mobile phone, of the cardholder 18. Once displayed, the cardholder 18 may then may enter the card replacement preferences 30 through the electronic device. In the example shown, the card replacement preference screen 350 is displayed by a digital wallet of the issuer 12, e.g., FDNB Bank, but would include similar content if displayed in a web application.

A digital wallet, also referred to as an "electronic wallet," "electronic wallet mobile application," and "digital wallet," is a software application configured to facilitate and/or conduct transactions. The digital wallet may display and transmit account identifiers or representations of the account identifiers (e.g., tokens), on behalf of accounts of the cardholder 18 to facilitate payments at more than one unrelated merchant, perform person-to-person payments, or load financial value into the digital wallet. In one embodiment, the issuer 12 may make the electronic wallet available to cardholders of the issuer 12. In another embodiment, a third party may be the electronic wallet provider. Examples of third-party electronic wallets may include, but are not limited to, Google Wallet™, Android Pay®, Apple Pay®, and Samsung Pay®.

In the example shown, the cardholder 18 has navigated to a card replacement preferences link, resulting in the display of the card replacement preference screen 350. The card replacement preference screen 350 may be populated with a list of account identifiers 352 of accounts issued to the cardholder 18 by the issuer 12. In one embodiment, the list of account identifiers 352 may be retrieved from the account repository 36. A graphical selection element 354, e.g., a set of radio buttons, is displayed next to the listed account identifiers 352 for the cardholder 18 to select one of the listed account identifiers as a replacement card. As is well known, radio buttons are arranged in groups of two or more and displayed on screen as a list of circles or squares that can contain white space (for unselected) or a dot (for selected), for example. Other types of graphical selection elements 354 may be used. When selecting from the list of account identifiers 352, the user is permitted to select only one of the account identifiers as a replacement card in one embodiment.

The card replacement preference screen 350 also displays a list of replacement preferences 356 that controls use of the replacement card, and optionally displays a list of merchant notification preferences 358 that control what the issuer communicates to the merchant as well as provide merchant instructions about the replacement card.

The list of replacement preferences 356 may enable the cardholder 18 to select one or more of the following example card replacement preferences: I) to use the replacement card for the selected transaction only; II) use the replacement card for all transactions; III) use the replacement card until a user selectable date; IV) if an authorization of the replacement card fails, continue the authorization using a previous selected card; V) for future replacement card selections, validate the cardholder to ensure that only the cardholder/account owner can select the replacement card.

The optional merchant notification preferences 358 may enable the cardholder 18 to select one or more of the following example merchant notification preferences: I) the issuer should notify the merchant to replace an existing card on file with the replacement card; II) the issuer should notify the merchant to add the replacement card as a separate card on file; III) the issuer should notify the merchant to move any recurring transactions to the replacement card.

Referring again to FIG. 3A, after the card preference module 32 receives the card replacement preferences 30 from the cardholder 18 at operation 300, the card preference module 32 can use the replacement preferences 30 to process transactions. For example, the merchant 16 initiates transaction processing at operation 302 by sending the transaction authorization request 28 to the payment processing network 14. At operation 304, the payment processing network 14 sends a second authorization request to the issuer 12.

According to aspects of the disclosed embodiments, the card preference module 32 receives the authorization request and searches the cardholder information and preference repository 34 at operation 306 to find any card replacement preferences 30 set by the cardholder 18 identified in the authorization data. The cardholder information and preference repository 34 responds at operation 308 by returning the current card replacement preferences 30 to the card preference module 32. For example, the cardholder information and preference repository 34 may return a token or the partial account identifier 352 of a replacement card selected in the card replacement preferences 30 that is to be used for at least the current transaction. The card preference module 32 uses the token or partial account identifier 352 of the replacement card to search the account repository 36 to find a matching account identifier from among a set of two or more cardholder accounts at operation 310. Once found, the account repository 36 returns the primary account number (PAN) of the replacement card at operation 312.

Once the issuer 12 determines the cardholder 18 is authorized to perform the current transaction (e.g., payment, cash deposit/withdrawal, money transfer, balance inquiries), the issuer 12 uses the PAN of the replacement card to process the transaction and returns an authorization response message to the payment processing network 14 at operation 314. At operation 316, the payment processing network 14 forwards the authorization response message to the merchant 16 (through an acquirer in some embodiments).

Prior to transmitting the authorization response message, the card preference module 32 also checks the replacement preferences 356 and the merchant notification preferences 358 for other preferences selected by the user and includes corresponding instructions in the authorization response message or another message based on those preferences. For example, if the preference for validating the cardholder is selected, then the card preference module 32 may send instructions to that effect in an authorization response message returned to the payment processing network 14. As another example, there may be a replacement preference 356 selected indicating that if authorization using the replacement card fails, then continue the authorization using the previously selected card.

In one embodiment, the issuer 12 by default may not notify the merchant 16 that a replacement card was used for the current transaction instead of the card sent in the authorization request. In another embodiment, the issuer 12 may notify the merchant 16 about the replacement card by default. In yet a third embodiment, the issuer 12 may notify the merchant 16 about the replacement card only if a corresponding merchant notification preference 358 is selected by the cardholder. For example, based on the merchant notification preferences 358 selected by the cardholder, the issuer 12 may notify the merchant 16 that the replacement card was used for the current transaction and provide data for the merchant 16 to perform an action with respect to this replacement activity. Examples of actions performed by the merchant 16 with respect to replacement activity may include replacing an existing card on file with the selected replacement card, adding the selected replacement card as a separate card on file, removal of the card on file, and moving any recurring transactions to the selected replacement. The notifications made to merchant may be included in the authorization response message or in a message the separate from the authorization response message.

It should be noted that the issuer 12 might offer a mandate for acquirers, merchants and other insurers to support the above replacement card scheme. In addition, any settlements must be made to the replacement card so that the issuer 12 and the acquirer knows which card was used in order to handle future dispute maintenance and reversals.

According to the method and system disclosed herein, the disclosed embodiments enable a cardholder to set preferences with an issuer (instead of the merchant) indicating that for the transactions received by the issuer for a current card on file, the issuer should process the transactions using the new card. By setting preferences once with the card issuer, the cardholder no longer has to register the new card multiple times with different merchants in order to direct future transactions, such as recurring payments, to the new card. In addition, the method and system leverages existing transaction infrastructure so that minimal changes are necessary to implement the disclosed process.

Figure 4:
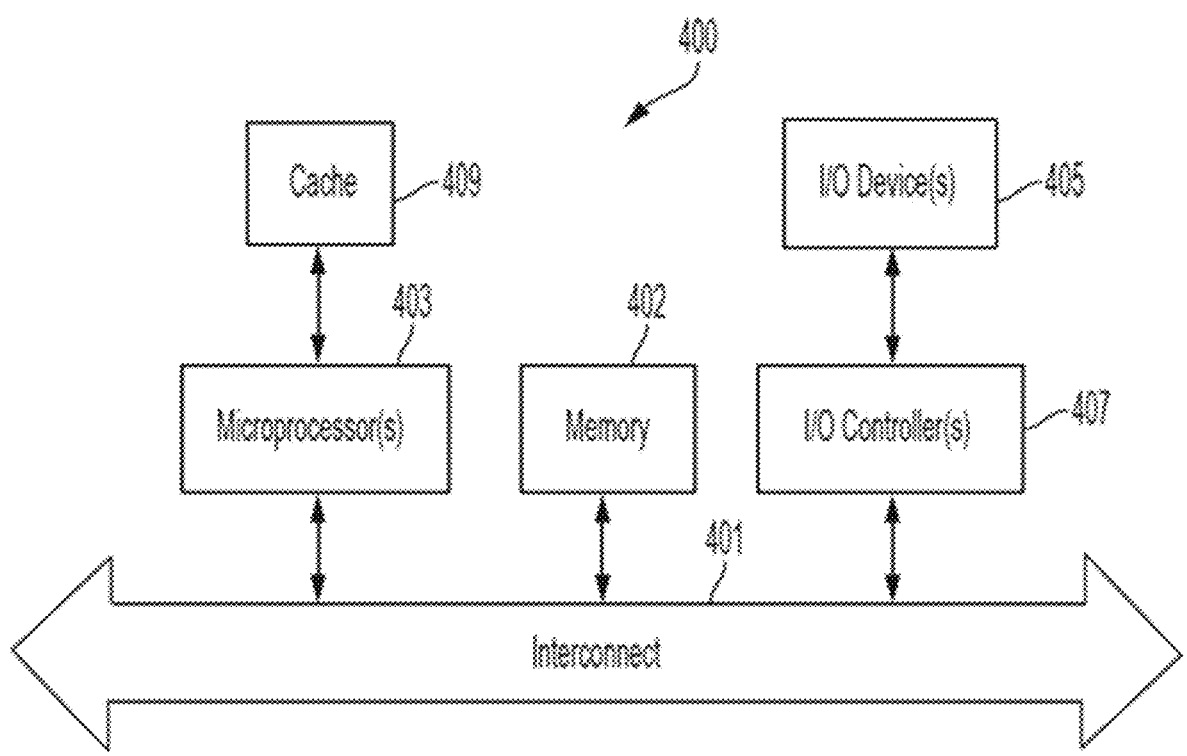
FIG. 4 shows an embodiment of a computer system for implementing the disclosed embodiments.

FIG. 4 shows an implementation of a computer system 400 that may be applicable to computing devices of the issuer 12, the payment processing network 14, merchant 16 and/or the payment device 20. According to an embodiment. The computer system 400 can include a microprocessor(s) 403 and memory 402. In an embodiment, the microprocessor(s) 403 and memory 402 can be connected by an interconnect 401 (e.g., bus and system core logic). In addition, the microprocessor 403 can be coupled to cache memory 409. In an embodiment, the interconnect 401 can connect the microprocessor(s) 403 and the memory 402 to input/output (I/O) device(s) 405 via I/O controller(s) 407. I/O devices 405 can include a display device and/or peripheral devices, such as mice, keyboards, modems, network interfaces, printers, scanners, video cameras and other devices known in the art. In an embodiment, (e.g., when the data processing system is a server system) some of the I/O devices (405), such as printers, scanners, mice, and/or keyboards, can be optional.

In an embodiment, the interconnect 401 can include one or more buses connected to one another through various bridges, controllers and/or adapters. In one embodiment, the I/O controllers 407 can include a USB (Universal Serial Bus) adapter for controlling USB peripherals, and/or an IEEE-1394 bus adapter for controlling IEEE-1394 peripherals.

In an embodiment, the memory 402 can include one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of the present disclosure.

A method and system for directing a transaction from one card to another card based on a cardholder preference provided to the issuer has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

We claim:

1. A method for programming a computer system of a issuer of a payment card to allow a cardholder to direct payment for transactions from one payment card to another that eliminates a need for the cardholder to manually notify each merchant for which the cardholder has a card on file, the method comprising:
   providing a wallet application for execution on an electronic device of the cardholder, the wallet application displaying a card preference screen that includes replacement preferences and merchant notification preferences to enable the cardholder to direct transactions from one card to another;
   retrieving from an account repository, by the computer system, account identifiers associated with the cardholder;
   populating, by the computer system over a network, the replacement preferences displayed on the electronic device by the wallet application with: I) a first account identifier that is currently used for transactions, II) other listed account identifiers of the cardholder, and III) a prompt for the cardholder to select one of the listed account identifiers as a replacement card;
   populating, by the computer system over the network, the merchant notification preferences to enable the cardholder to control what the issuer communicates to one or more merchants about the replacement card including: I) the issuer should notify a particular merchant to replace an existing card on file with the replacement card; II) the issuer should notify the particular merchant to add the replacement card as a separate card on file; III) the issuer should notify the particular merchant to move any recurring transactions to the replacement card;
   receiving, by the issuer computer over the network, the card replacement preferences and the merchant notification preferences selected by the cardholder, including an indication that a second account identifier is to be used as a replacement card to process one or more future transactions;
   storing, in a preference repository separate from an account repository, the card replacement preferences, including the merchant notification preferences, and the second account identifier as a token;
   responsive to receiving over the network, by the computer system, a first authorization request for a first transaction between the cardholder and a first merchant using the first account identifier, processing the first authorization request using the card replacement preferences by:
   i) searching, by the computer system, the preference repository to find the card replacement preferences set by the cardholder identified in the authorization request, wherein once found, the preference repository returns a token or a portion of the second account identifier of the replacement card;
   ii) using, by the computer system, the token or the portion of the second account identifier of the replacement card to search the account repository to find a matching account identifier from among a set of two or more cardholder accounts, wherein once found, the account repository returns the primary account number (PAN) of the replacement card;
   iii) authorizing, by the computer system, the first transaction using the PAN of the replacement card in place of the first account identifier without knowledge by the first merchant that the PAN was used;
   iv) returning, by the issuer computer, a first authorization response to the first merchant or an acquirer; and
   v) sending, by the computer system over the network, a first notification to a computer system of the first merchant using the merchant notification preferences set by the cardholder, the first notification including: an indication that the first account identifier of the cardholder was replaced by the second account identifier of the cardholder for the transaction; and
   receiving, by the computer system over the network, a second authorization request for a second authentication request for a second transaction between the cardholder and a second merchant using the first account identifier, and repeating steps i)-iv) to process the second authorization request, including sending, by the computer system over the network, a second notification to a computer system of the second merchant using the merchant notification preferences set by the cardholder.

2. The method of claim 1, further comprising: including in the first notification sent to the computer system of the first merchant an instruction to take an action, including updating a merchant record of the cardholder by replacing the first account identifier with the second account identifier.

3. The method of claim 1, further comprising: displaying the list of replacement preferences to enable the cardholder to select one or more of: I) to use the replacement card for a current transaction only; II) use the replacement card for all transactions; III) use the replacement card until a user selectable date; IV) if an authorization of the replacement card fails, continue the authorization using a previous selected card; V) for future replacement card selections, validate the cardholder to ensure that only the cardholder can select the replacement card.

4. The method of claim 1, wherein returning the authorization response to the merchant further comprises: returning with the authorization response, the first notification with instructions to the merchant based on the preferences set by the cardholder.

5. A non-transitory computer readable medium having stored thereon software instructions that, when executed by a computer processor, cause the computer processor of a issuer of a payment card to allow a cardholder to direct payment for transactions from one payment card to another that eliminates a need for the cardholder to manually notify each merchant for which the cardholder has a card on file, by executing the steps comprising:
   providing a wallet application for execution on an electronic device of the cardholder, the wallet application displaying a card preference screen that includes replacement preferences and merchant notification preferences to enable the cardholder to direct transactions from one card to another;

retrieving from an account repository, by the computer processor, account identifiers associated with the cardholder;

populating, by the computer processor over a network, the replacement preferences displayed on the electronic device by the wallet application with: I) a first account identifier that is currently used for transactions, II) other listed account identifiers of the cardholder, and III) a prompt for the cardholder to select one of the listed account identifiers as a replacement card;

populating, by the computer processor the network, the merchant notification preferences to enable the cardholder to control what the issuer communicates to one or more merchants about the replacement card including: I) the issuer should notify a particular merchant to replace an existing card on file with the replacement card; II) the issuer should notify the particular merchant to add the replacement card as a separate card on file; III) the issuer should notify the particular merchant to move any recurring transactions to the replacement card;

receiving, by the issuer computer over the network, the card replacement preferences and the merchant notification preferences selected by the cardholder, including an indication that a second account identifier is to be used as a replacement card to process one or more future transactions;

storing, in a preference repository separate from an account repository, the card replacement preferences, including the merchant notification preferences, and the second account identifier as a token;

responsive to receiving over the network, by the computer processor, a first authorization request for a first transaction between the cardholder and a first merchant using the first account identifier, processing the first authorization request using the card replacement preferences by:
  i) searching, by the computer processor, the preference repository to find the card replacement preferences set by the cardholder identified in the authorization request, wherein once found, the preference repository returns a token or a portion of the second account identifier of the replacement card;
  ii) using, by the computer processor, the token or the portion of the second account identifier of the replacement card to search the account repository to find a matching account identifier from among a set of two or more cardholder accounts, wherein once found, the account repository returns the primary account number (PAN) of the replacement card;
  iii) authorizing, by the issuer computer, the first transaction using the PAN of the replacement card in place of the first account identifier without knowledge by the first merchant that the PAN was used;
  iv) returning, by the issuer computer, a first authorization response to the first merchant or an acquirer; and
  v) sending, by the issuer computer over the network, a first notification to a computer system of the first merchant using the merchant notification preferences set by the cardholder, the first notification including: an indication that the first account identifier of the cardholder was replaced by the second account identifier of the cardholder for the transaction; and receiving, by the computer processor over the network, a second authorization request for a second authentication request for a second transaction between the cardholder and a second merchant using the first account identifier, and repeating steps i)-iv) to process the second authorization request, including sending, by the computer system over the network, a second notification to a computer system of the second merchant using the merchant notification preferences set by the cardholder.

6. The non-transitory computer readable medium of claim 5, further comprising: including in the first notification sent to the computer system of the the first merchant an instruction to take an action, including updating a merchant record of the cardholder by replacing the first account identifier with the second account identifier.

7. A computer system of a payment card issuer that allows a cardholder to direct payment for transactions from one payment card to another, which eliminates a need for the cardholder to manually notify each merchant for which the cardholder has a card on file, comprising:
  a wallet application executing on an electronic device of the cardholder, the wallet application displaying a card preference screen that includes replacement preferences that control use of a replacement card and merchant notification preferences that enable a cardholder to direct transactions from one card to another,
  wherein the replacement preferences control use of a replacement card and is populated with a list of account identifiers retrieved from an account repository that shows a first account identifier is currently used for transactions and includes a prompt to select one of the listed account identifiers as a replacement card, and
  wherein the merchant notification preferences enable the cardholder to control what an issuer communicates to one or more merchants about the replacement card including: I) the issuer should notify a particular merchant to replace an existing card on file with the replacement card; II) the issuer should notify the particular merchant to add the replacement card as a separate card on file; III) the issuer should notify the particular merchant to move any recurring transactions to the replacement card;
  a memory;
  a processor coupled to the memory; and
  a software component executed by the processor that is configured to:
    responsive to a wallet application executing an electronic device of a cardholder, retrieve from an account repository account identifiers associated with the cardholder;
    populate over a network a card preference screen displayed by the wallet application with replacement preferences that control use of a replacement card and merchant notification preferences that enable a cardholder to direct transactions from one card to another, the replacement preferences populated with: I) a first account identifier that is currently used for transactions, II) other listed account identifiers of the cardholder, and III) a prompt for the cardholder to select one of the listed account identifiers as a replacement card;
    populate over the network the merchant notification preferences with selections that enable the cardholder to control what a card issuer communicates to one or more merchants about the replacement card, the selections including: I) the issuer should notify a particular merchant to replace an existing card on file with the replacement card; II) the issuer should notify the particular merchant to add the replacement card as a separate card on file; III) the issuer should notify the particular merchant to move any recurring transactions to the replacement card;

receive over the network the card replacement preferences and the merchant notification preferences selected by the cardholder, including an indication that a second account identifier is to be used as a replacement card to process one or more future transactions;

store, in a preference repository separate from an account repository, the card replacement preferences, including the merchant notification preferences and the second account identifier as a token;

responsive to receiving over the network a first authorization request for a first transaction between the cardholder and a first merchant using the first account identifier, processing the first authorization request using the card replacement preferences by the software component, the software component further configured to:

i) search a preference repository to find the card replacement preferences set by the cardholder identified in the authorization request, wherein once found, the preference repository returns a token or a portion of the second account identifier of the replacement card;

ii) use the token or the portion of the second account identifier of the replacement card to search the account repository to find a matching account identifier from among a set of two or more cardholder accounts, wherein once found, the account repository returns the primary account number (PAN) of the replacement card;

iii) authorize the first transaction using the PAN of the replacement card in place of the first account identifier without knowledge by the first merchant that the PAN was used;

iv) returning a first authorization response to the first merchant or an acquirer;

v) send over the network a first notification to a computer system of the first merchant using the merchant notification preferences set by the cardholder, the first notification including: an indication that the first account identifier of the cardholder was replaced by the second account identifier of the cardholder for the transaction; and receive over the network a second authorization request for a second authentication request for a second transaction between the cardholder and a second merchant using the first account identifier, and repeating steps i)-iv) to process the second authorization request, including sending over the network a second notification to a computer system of the second merchant using the merchant notification preferences set by the cardholder.

* * * * *